(12) United States Patent
Chen et al.

(10) Patent No.: US 8,285,322 B2
(45) Date of Patent: Oct. 9, 2012

(54) MINIMIZING INTER-FEMTOCELL DOWNLINK INTERFERENCE

(75) Inventors: Xiang Chen, Rolling Meadows, IL (US);
Ying Cai, Schaumburg, IL (US); Peilu Ding, Arlington Heights, IL (US);
Xiaowei Jin, Palatine, IL (US);
Ravindra P. Moorut, Port Barrington, IL (US)

(73) Assignee: Motorola Mobility LLC, Libertyville, IL (US)

( * ) Notice: Subject to any disclaimer, the term of this patent is extended or adjusted under 35 U.S.C. 154(b) by 323 days.

(21) Appl. No.: 12/536,085

(22) Filed: Aug. 5, 2009

(65) Prior Publication Data

US 2010/0035628 A1 Feb. 11, 2010

Related U.S. Application Data

(60) Provisional application No. 61/087,201, filed on Aug. 8, 2008.

(51) Int. Cl.
*H04W 72/00* (2009.01)

(52) U.S. Cl. .................. 455/525; 455/452.1; 455/422.1; 370/318

(58) Field of Classification Search .................. 455/444, 455/452.2
See application file for complete search history.

(56) References Cited

U.S. PATENT DOCUMENTS

| | | | |
|---|---|---|---|
| 7,801,066 B2 | 9/2010 | Wang et al. | |
| 7,848,221 B2 | 12/2010 | Ding et al. | |
| 7,860,521 B2 | 12/2010 | Chen et al. | |
| 2006/0019665 A1 * | 1/2006 | Aghvami et al. | 455/444 |
| 2008/0130620 A1 | 6/2008 | Liu et al. | |
| 2008/0130676 A1 | 6/2008 | Liu et al. | |
| 2008/0139212 A1 | 6/2008 | Chen et al. | |
| 2008/0188265 A1 | 8/2008 | Carter et al. | |
| 2009/0135754 A1 | 5/2009 | Yavuz et al. | |
| 2009/0137221 A1 | 5/2009 | Nanda et al. | |
| 2009/0137241 A1 | 5/2009 | Yavuz et al. | |
| 2009/0190500 A1 | 7/2009 | Ji et al. | |
| 2009/0288140 A1 | 11/2009 | Huber et al. | |
| 2010/0027694 A1 | 2/2010 | Touboul et al. | |
| 2010/0035556 A1 | 2/2010 | Cai et al. | |
| 2010/0035628 A1 | 2/2010 | Chen et al. | |

OTHER PUBLICATIONS

EPC Extended Search Report, RE: Application #09010286.4-2412 Dec. 16, 2009.

(Continued)

*Primary Examiner* — Kamran Afshar
*Assistant Examiner* — Sayed T Zewari
(74) *Attorney, Agent, or Firm* — Stewart M. Wiener

(57) ABSTRACT

A system and method for minimizing interference for mobile devices operating in a communication network that includes a centralized controller and a number of femtocells, each femtocell including a base station. The method calculates a power assignment priority for each femtocell, and determines a priority order of the femtocells, the priority order based on the power assignment priority calculated for each femtocell. The method calculates a power to assign to the base station for each femtocell based on the priority order. The method allocates a first portion of the power assigned to the base station for each femtocell as required for real-time traffic, and a second portion of the power assigned to the base station for each femtocell as required for non-real-time traffic.

16 Claims, 3 Drawing Sheets

OTHER PUBLICATIONS

3GPP: "3GPP TR 25.967 9.0.0; 3rd Generation Partnership Project; Technical Specification Group Radio Access Networks; Home Node B Radio Frequency (RF) Requirements (FDD) (Release 9)" May 2009, pp. 1-55; XP002558547, pp. 26-32, "7.2 Control of HNB Downlink Interference", in particular, p. 31, "7.2.1.2 Centralized HNB Power Control".

Xiangfang Li, et al; "Downlink Power Control in Co-Channel Macrocell Femtocell Overlay" Information Sciences and Systems, Mar. 18, 2009, pp. 383-388.

3rd Generation Partnership Project (3GPP), Technical Specification Group Radio Access Networks, Home Node B Radio Frequency (RF) Requirements (FDD), Release 9, Technical Report (TR) 25.967 9.0.0 (May 2009).

EPC Extended Search Report, RE: Application #09010284.9-2413; Jan. 26, 2010.

"Technical Specification Group Radio Access Networks; 3G Home Node B Study Item Technical Report (Release 8) V8.1.1." Retrieved from Internet (www.3gpp.org), May 2008, pp. 1-40.

Nortel, et al, "Open and Closed Access for Home Node Bs" 3GPP Draft, Aug. 14, 2007, pp. 1-6.

Qualcomm Europe: "Restricted Association for HNB's" 3GPP Draft, Nov. 12, 2007, pp. 1-6.

Office Action, EPC App. No. 09010284.9-2413, Sep. 24, 2010.
Office Action, EPC App. No. 09010284.9-2413, Aug. 8, 2011.
Office Action, U.S. Appl. No. 12/536,125, Nov. 28, 2011.

Claussen, Holger, "Performance of Macro- and Co-Channel Femtocells in a Hierarchical Cell Structure", The 18th Annual IEEE International Symposium on Personal, Indoor and Mobile Radio Communications, 2007.

Alcatel-Lucent, "Simulation results of macro-cell and co-channel Home NodeB with power configuration and open access", 3GPP TSG-RAN WG4 (Radio) Meeting #44bis R4-071578, Shanghai, China, Oct. 2007.

Ubiquisys Ltd., "Femto Cell Radio Resource Management (RRM) and Interference management White Paper," UbiquiSys Ltd., 2007.

Qualcomm Europe, "Simple Models for Home NodeB Interference Analysis", 3GPP TSG-RAN Working Group 4 (Radio) meeting #46 R4-080409, Sorrento, Italy, Feb. 2008.

3GPP, "Technical Specification Group Radio Access Networks; 3G Home NodeB Study Item Technical Report (Release 8)", TR 25.820 Version 1.0.0, Nov. 2007.

Office Action, EPC App. No. 09010286.4-2412, Sep. 2, 2010.
Office Action, EPC App. No. 09010286.4-2412, Aug. 4, 2011.

* cited by examiner

MINIMIZING INTER-FEMTOCELL DOWNLINK INTERFERENCE

RELATED APPLICATIONS

This application for letters patent relates to and claims the benefit of U.S. Provisional Patent Application Ser. No. 61/087,201, titled "MINIMIZING INTER-FEMTOCELL DOWNLINK INTERFERENCE", and filed on Aug. 8, 2008; the disclosure of which this application hereby incorporates by reference.

BACKGROUND

In telecommunications, a femtocell, originally known as an Access Point Base Station, is a small cellular base station, typically designed for use in residential or small business environments. The femtocell is a user-deployed home base station (BS) that provides improved home coverage and increases the capacity for user traffic using a backhaul connection to a service provider, such as an Internet Protocol (IP) connection over the user's Digital Subscriber Line (DSL), cable, satellite, fiber-optic, or other high-speed or broadband connection. Current femtocell designs typically support 2 to 4 active mobile phones in a residential setting. Due to co-channel or adjacent-channel operation, it is very challenging to address interference between nearby femtocells or between femtocells and an existing macrocell, that is, a cell in a mobile phone network that provides radio coverage served by a power cellular base station (tower).

The prior art and currently proposed solutions for minimizing inference between femtocells and femtocells or between femtocells and macrocells can be classified into three categories: (1) power control; (2) separation in frequency; and (3) separation in time.

Power Control. A power adaptation algorithm can mitigate interference from femtocells to macrocells. The basic theory is to lower the transmission power of a femtocell BS and femtocell user equipment (UE) as much as possible, so that the interference to the macrocells is reduced while maintaining reasonable performance of femtocells. To achieve this, the femtocell utilizes the measurement of the channel parameter from its attached UEs to set the transmission power of both the femtocell BS and femtocell UEs.

Separation in Frequency. The basic theory is to separate the transmission of femtocells and macrocells in different frequencies. This reduces interference by limiting the frequencies that are shared by femtocells and macrocells.

Separation in Time. Another interference mitigation technique is time re-use or time sharing, that is, separating the transmission of different femtocells, or femtocells and macrocell UEs, in time. This interference mitigation technique has been proposed for Universal Mobile Telecommunications System (UMTS) femtocell systems. The idea is to lower (or even turn off) the femtocell downlink (DL) transmit power during certain time periods to reduce interference to close-by UEs (either femtocell UEs attached to another femtocell BS or macrocell UEs). This technique assumes a square ON/OFF power pattern for the femtocell. The period and utility cycle of the patterns are design parameters. Given a certain pattern, each femtocell can pick the best time offset for its UE by sensing the time offset of the neighboring femtocells. This could reduce the interference between a femtocell and other femtocells or between femtocells and macrocells.

SUMMARY

Aspects of the present invention provide a system and method for minimizing interference for mobile devices operating in a communication network that includes a centralized controller and a number of femtocells, each femtocell including a base station. The method calculates a power assignment priority for each femtocell, and determines a priority order of the femtocells, the priority order based on the power assignment priority calculated for each femtocell. The method calculates a power to assign to the base station for each femtocell based on the priority order. The method allocates a first portion of the power assigned to the base station for each femtocell as required for real-time traffic, and a second portion of the power assigned to the base station for each femtocell as required for non-real-time traffic.

DETAILED DESCRIPTION

Figure 1:
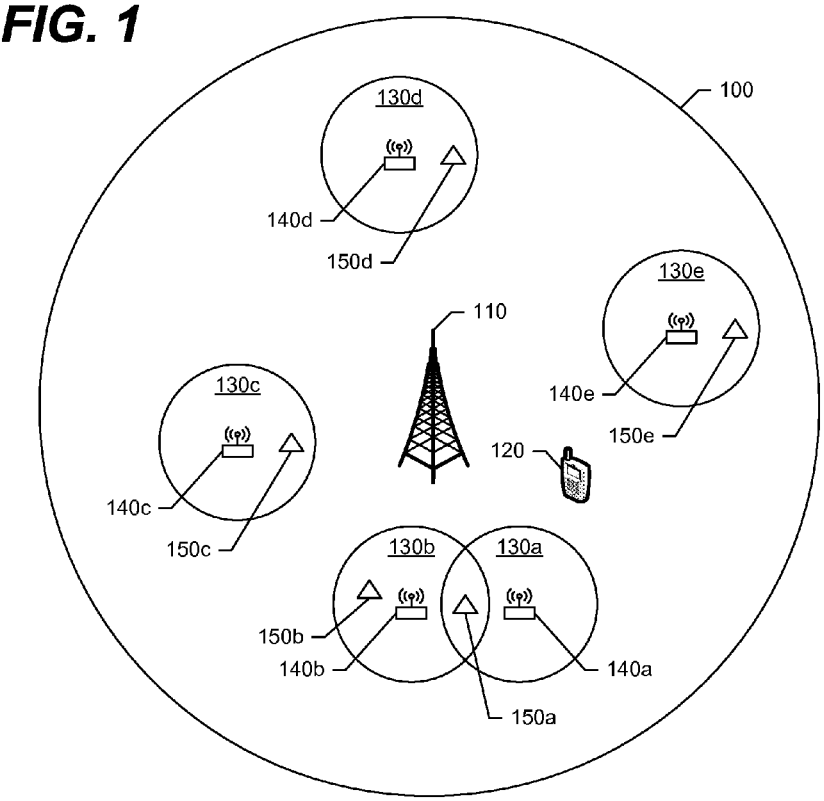
FIG. 1 is network diagram that illustrates one embodiment of the hardware components of a system that performs the present invention.

FIG. 1 is network diagram that illustrates one embodiment of the hardware components of a system that performs the present invention. FIG. 1 shows a macrocell base station (BS) 110 that controls communications in a macrocell 100 coverage range. In one embodiment, the macrocell 100 coverage range is a residential or business area. In another embodiment, the coverage range for the macrocell 100 includes a number of residential or business areas. The macrocell user equipment (UE) 120, such as a mobile telephone or other mobile communication device, communicates voice and data via the macrocell BS 110 with another macrocell UE (not shown) either in the macrocell 100 coverage range or in another macrocell (not shown) coverage range.

The macrocell 100 shown in FIG. 1 includes a number, N, of femtocells 130a-130e. Each femtocell 130a-130e includes a femtocell BS 140a-140e, respectively, that controls voice and data communications in the femtocell 130a-130e coverage range. The femtocells 130a-130e form a cluster in the macrocell 100. The macrocell 100 also includes a centralized controller that connects the femtocell BSs 140a-140e. In the embodiment shown in FIG. 1, the centralized controller is software, implemented without additional hardware, operating on both the femtocell BSs 140a-140e and the macrocell BS 110. In another embodiment, the centralized controller is a software module implemented on a femtocell gateway (GW), a separate hardware device that connects several femtocell BSs, such as femtocell BSs 140a-140e, to the macrocell BS 110 via a network, wherein the macrocell 100 may include several femtocell GWs. In yet another embodiment, the centralized controller is software, implemented without additional hardware, operating on femtocell BSs 140a-140e. In yet another embodiment, the centralized controller is software, implemented without additional hardware, operating on the macrocell BS 110.

Each femtocell BS 140a-140e has a scheduling period for sending, or pushing, scheduling data to the centralized controller. The scheduling period, i.e., the duration of time between successive sends of the scheduling data, is a design or configuration parameter for the femtocell BS 140a-140e. The scheduling data that the femtocell BS 140a-140e sends to the centralized controller may include: (1) whether the femtocell BS 140*a*-140*e* is connected and communicating with active femtocell UEs 150*a*-150*e*; (2) when there are active femtocell UEs 150*a*-150*e*, the traffic type for each femtocell UE 150*a*-150*e* (e.g., voice or data); and (3) the measurement reports for any active femtocell UEs 150*a*-150*e* to obtain the path loss from the femtocell UE 150*a*-150*e* to the neighboring femtocell BS 140*a*-140*e*.

Figure 2:
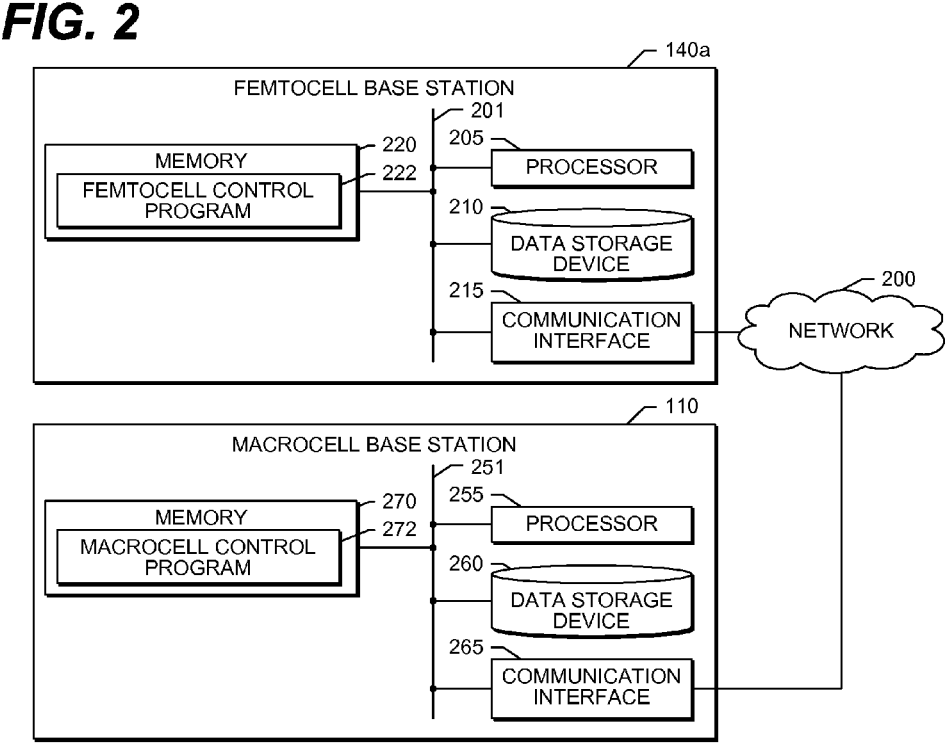
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. In particular, FIG. 2 illustrates the hardware components and software comprising the centralized controller for a cluster of femtocells 130*a*-130*e*.

The femtocell BS 140*a* shown in FIG. 2 is a general-purpose computing device that performs the present invention. A bus 201 is a communication medium that connects a processor 205, data storage device 210 (such as a disk drive, flash drive, flash memory, or the like), communication interface 215, and memory 220. The communication interface 215 transmits and receives the data between the femtocell BS 140*a* and the macrocell BS 110 via the network 200.

The processor 205 performs the disclosed methods by executing the sequences of operational instructions that comprise each computer program resident in, or operative on, the memory 220. The reader should understand that the memory 220 may include operating system, administrative, and database programs that support the programs disclosed in this application. In one embodiment, the configuration of the memory 220 of the femtocell BS 140*a* includes a femtocell control program 222. The femtocell control program 222 performs the method of the present invention disclosed in detail in FIG. 3. When the processor 205 performs the disclosed methods, it stores intermediate results in the memory 220 or data storage device 210. In another embodiment, the memory 220 may swap these programs, or portions thereof, in and out of the memory 220 as needed, and thus may include fewer than all of these programs at any one time.

The macrocell BS 110 shown in FIG. 2 is a general-purpose computing device that performs the present invention. A bus 251 is a communication medium that connects a processor 255, data storage device 260 (such as a disk drive, flash drive, flash memory, or the like), communication interface 265, and memory 270. The communication interface 265 transmits and receives the data between the macrocell BS 110 and the femtocell BS 140*a* via the network 200.

The processor 255 performs the disclosed methods by executing the sequences of operational instructions that comprise each computer program resident in, or operative on, the memory 270. The reader should understand that the memory 270 may include operating system, administrative, and database programs that support the programs disclosed in this application. In one embodiment, the configuration of the memory 270 of the macrocell BS 110 includes a macrocell control program 272. The macrocell control program 272 performs the method of the present invention disclosed in detail in FIG. 3. When the processor 255 performs the disclosed methods, it stores intermediate results in the memory 270 or data storage device 260. In another embodiment, the memory 270 may swap these programs, or portions thereof, in and out of the memory 270 as needed, and thus may include fewer than all of these programs at any one time.

The network 200 shown in FIG. 2, in an exemplary embodiment, is a public communication network that connects the femtocell BS 140 and the macrocell BS 110. The present invention also contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA), Code Division Multiple Access (CDMA), or Orthogonal Frequency Division Multiplexing (OFDM) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

Figure 3:
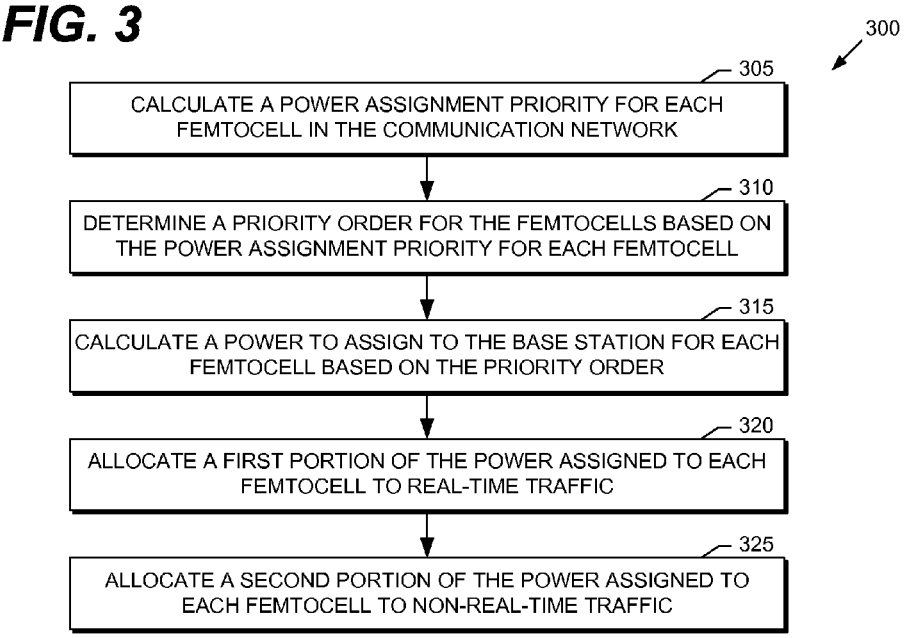
FIG. 3 is a flow chart that illustrates one embodiment of a method for minimizing interference in a communication network for the present invention.

FIG. 3 is a flow chart that illustrates one embodiment of a method for minimizing interference in a communication network for the present invention. With reference to FIG. 1 and FIG. 2, the process 300 shown in FIG. 3 begins by calculating a power assignment priority for each of the femtocells 130*a*-130*e* under the control of the centralized controller (step 305). In one embodiment, the process 300 calculates the power assignment priority for each of the femtocells 130*a*-130*e* as:

$$R_i(n) = \frac{\lambda_{RT,i}(n)\lambda_{NRT,i}(n)P_{req,i}(n)}{P_{avg,i}(n)} \qquad \text{Eqn. (1)}$$

where $R_i(n)$ is the power assignment priority for femtocell i in scheduling period n;

$\lambda_{RT,i}(n)$ is the weighting factor for real-time traffic for femtocell i in scheduling period n;

$\lambda_{NRT,i}(n)$ is the weighting factor for non-real-time traffic for femtocell i in scheduling period n;

$P_{req,i}(n)$ is the required power for femtocell i in scheduling period n to support its active users, which can be approximated from a path loss of UEs, a required Signal to Interference plus Noise Ratio (SINR), or an estimated interference; and $P_{avg,i}(n)$ is the average power usage for femtocell i in scheduling period n.

The process 300 shown in FIG. 3 then determines a priority order for the femtocells 130*a*-130*e* based on the power assignment priority for each femtocell (step 310). In various other embodiments, the centralized controller determines the priority order using a proportional fair scheduling algorithm, or a round-robin scheduling algorithm.

The process 300 shown in FIG. 3 then uses the priority order determined for the femtocells 130*a*-130*e*, in a decreasing order of priority (i.e., from a high priority femtocell to a low priority femtocell), to calculate a power to assign to the femtocell BS 140*a*-140*e* for each femtocell 130*a*-130*e* (step 315). In one embodiment, the process shown in FIG. 3 calculates the power to assign to the femtocell BS 140*a*-140*e* for each femtocell 130*a*-130*e* as:

$$P_i(n) = \min \begin{pmatrix} \left( \sum_{j=1}^{N_{RT,i}(n)} SINR_{RT,j}(NF+I)PL_{j,i} + \right. \\ \left. \sum_{j=1}^{N_{NRT,i}(n)} SINR_{NRT,j}(NF+I)PL_{j,i} \right), \\ P_{max}, \\ P_{i,allowed} \end{pmatrix} \quad \text{Eqn. (2)}$$

where $P_i(n)$ is the power assigned to femtocell i in scheduling period n;

$N_{RT,i}(n)$ is the number of active real-time users in femtocell i in scheduling period n;

$SINR_{RT}$ is the required SINR of real-time users;

$N_{NRT,i}(n)$ is the number of active non-real-time users in femtocell i in scheduling period n;

$SINR_{NRT}$ is the required SINR of non-real-time users;

NF is the noise floor at each UE including thermal noise and noise figure;

$PL_{j,1}$ is the path loss from UE j to femtocell BS i;

$P_{max}$ is the maximum transmit power of a femtocell BS;

$P_{i,allowed}$ is the transmit power allowed by those femtocell BSs that have a power assignment priority higher than femtocell BS i, obtained, e.g. as $$P_{i,allowed} = \min_{\forall j \text{ where } R_j(n) > R_i(n)} (I_{available,j} \times PL_{BS\_i,UE\_j}), \text{ where}$$

$$I_{available,j} = I - \sum_{\forall k \text{ where } R_k(n) > R_j(n)} P_k(n) \times PL_{BS\_k,UE\_j},$$

and $PL_{BS\_i,UE\_j}$ is the average path loss between femtocell BS i and UE j; and I is the received interference at a UE associated with femtocell BS i from other neighboring femtocells, obtained, e.g., from the histogram of UE perceived interference.

For each femtocell BS i which has had power assigned, the process 300 shown in FIG. 3 then allocates a first portion of the power assigned to real-time traffic (step 320), and a second portion of the power assigned to non-real-time traffic (step 325). In one embodiment, assuming that real-time traffic enjoys a higher priority than non-real-time traffic, (1) the required power for a real-time user j is set to $SINR_{RT,j}(NF+I_i)PL_{j,i}$; and (2) if all the real-time users are assigned power, the required power for non-real-time user j is set to $SINR_{NRT,j}(NF+I_i)PL_{j,i}$. In another embodiment, a Signal to Noise Ratio (SNR) replaces the SINR; however, SINR provides greater accuracy than SNR.

Unlike the prior art time-sharing schemes, where a femtocell can only transmit in its legitimate time slots, the various embodiments of the invention described herein allow more than one femtocell to transmit, thereby increasing the overall femtocell throughput or system capacity.

The various embodiments of the invention described herein can be deployed in a variety of systems, including, by way of example and not limitation, CDMA2000, UMTS, and/or LTE (Long Term Evolution) systems, and using any of a variety of channel access methods, for example, Wideband Code Division Multiple Access (WCDMA) and Orthogonal Frequency-Division Multiple Access (OFDMA).

It is also noted that an embodiment of the invention could be used together with power control schemes, such as the power control solution discussed above.

Although the disclosed embodiments describe a fully functioning method for minimizing interference for mobile devices operating in a communication network, the reader should understand that other equivalent embodiments exist. Since numerous modifications and variations will occur to those reviewing this disclosure, the method for minimizing interference for mobile devices operating in a communication network is not limited to the exact construction and operation illustrated and disclosed. Accordingly, this disclosure intends all suitable modifications and equivalents to fall within the scope of the claims.

We claim:

1. A method for minimizing interference for mobile devices operating in a communication network that includes a centralized controller and at least one femtocell, each femtocell including a base station, the method comprising:
   calculating a power assignment priority for each femtocell;
   determining a priority order for said at least one femtocell, the priority order based on the power assignment priority calculated for each femtocell;
   calculating a power to assign to the base station for each femtocell based on the priority order;
   allocating a first portion of the power assigned to the base station for each femtocell as required for real-time traffic; and
   allocating a second portion of the power assigned to the base station for each femtocell as required for non-real-time traffic.

2. The method of claim 1, wherein the power assignment priority calculated for each femtocell includes a real-time traffic weighting factor, a non-real-time traffic weighting factor, a required power level, and an average power usage.

3. The method of claim 2, wherein $R_i(n)$ is the power assignment priority for femtocell i in period n, and $R_i(n)$ is calculated as $$R_i(n) = \frac{\lambda_{RT,i}(n)\lambda_{NRT,i}(n)P_{req,i}(n)}{P_{avg,i}(n)},$$

wherein:
   $\lambda_{RT,i}(n)$ is a real-time traffic weighting factor for femtocell i in period n,
   $\lambda_{NRT,i}(n)$ is a non-real-time traffic weighting factor for femtocell i in period n,
   $P_{req,i}(n)$ is a required power level for femtocell i in period n, and
   $P_{avg,i}(n)$ is an average power usage for femtocell i in period n.

4. The method of claim 2, wherein the required power level for each femtocell is approximated from a path loss of a mobile device in the communication network, a required Signal to Interference plus Noise Ratio (SINR), or an estimated interference.

5. The method of claim 1, wherein the priority order is from a high priority femtocell to a low priority femtocell.

6. The method of claim 1, wherein $P_i(n)$ is the power to assign to the base station for femtocell i in period n, and $P_i(n)$ is calculated as $$P_i(n) = \min \begin{pmatrix} \left[ \sum_{j=1}^{N_{RT,i}(n)} SINR_{RT,j}(NF+I)PL_{j,i} + \right. \\ \left. \sum_{j=1}^{N_{NRT,i}(n)} SINR_{NRT,j}(NF+I)PL_{j,i} \right], \\ P_{max}, \\ P_{i,allowed} \end{pmatrix}$$

wherein:

$N_{RT,i}(n)$ is a number of active real-time users in femtocell i in period n, $SINR_{RT}$ is a required SINR of real-time users, $N_{NRT,i}(n)$ is a number of active non-real-time users in femtocell i in period n, $SINR_{NRT}$ is a required SINR of non-real-time users, NF is a noise floor at each mobile device, the noise floor including thermal noise and noise figure, $PL_{j,i}$ is a path loss from mobile device j to the base station for femtocell i, $P_{max}$ is a maximum transmit power of the base station for one of said at least one femtocell, $P_{i,allowed}$ is a transmit power allowed by those the base station for femtocells that have a higher power assignment priority higher than the base station for femtocell i, and I is a received interference at the mobile devices associated with the base station for femtocell i from other neighboring femtocells.

7. The method of claim 6, wherein $P_{i,allowed}$ is calculated as $$P_{i,allowed} = \min_{\forall j \text{ where } R_j(n) > R_i(n)} (I_{available,j} \times PL_{BS\_i,UE\_j}), \text{ wherein}$$

$$I_{available,j} = I - \sum_{\forall k \text{ where } R_k(n) > R_j(n)} P_k(n) \times PL_{BS\_k,UE\_j}, \text{ and}$$

$PL_{BS\_i,UE\_j}$ is an average path loss between the base station for femtocell i and mobile device j.

8. A non-transitory computer-readable medium, comprising computer-executable instructions that, when executed on a computing device, perform the method of claim 1.

9. A system for minimizing interference for mobile devices operating in a communication network that includes a centralized controller and at least one femtocell, each femtocell including a base station, comprising:

a memory device resident in the centralized controller; and a processor disposed in communication with the memory device, the processor configured to:

calculate a power assignment priority for each femtocell;

determine a priority order for said at least one femtocell, the priority order based on the power assignment priority calculated for each femtocell;

calculate a power to assign to the base station for each femtocell based on the priority order;

allocate a first portion of the power assigned to the base station for each femtocell as required for real-time traffic; and allocate a second portion of the power assigned to the base station for each femtocell as required for non-real-time traffic.

10. The system of claim 9, wherein the power assignment priority calculated for each femtocell includes a real-time traffic weighting factor, a non-real-time traffic weighting factor, a required power level, and an average power usage.

11. The system of claim 10, wherein $R_i(n)$ is the power assignment priority for femtocell i in period n, and $R_i(n)$ is calculated as $$R_i(n) = \frac{\lambda_{RT,i}(n)\lambda_{NRT,i}(n)P_{req,i}(n)}{P_{avg,i}(n)},$$

wherein:

$\lambda_{RT,i}(n)$ is a real-time traffic weighting factor for femtocell i in period n, $\lambda_{NRT,i}(n)$ is a non-real-time traffic weighting factor for femtocell i in period n, $P_{req,i}(n)$ is a required power level for femtocell i in period n, and $P_{avg,i}(n)$ is an average power usage for femtocell i in period n.

12. The system of claim 10, wherein the required power level for each femtocell is approximated from a path loss of a mobile device in the communication network, a required Signal to Interference plus Noise Ratio (SINR), or an estimated interference.

13. The system of claim 9, wherein the priority order is from a high priority femtocell to a low priority femtocell.

14. The system of claim 9, wherein $P_i(n)$ is the power to assign to the base station for femtocell i in period n, and $P_i(n)$ is calculated as $$P_i(n) = \min \begin{pmatrix} \left[ \sum_{j=1}^{N_{RT,i}(n)} SINR_{RT,j}(NF+I)PL_{j,i} + \right. \\ \left. \sum_{j=1}^{N_{NRT,i}(n)} SINR_{NRT,j}(NF+I)PL_{j,i} \right], \\ P_{max}, \\ P_{i,allowed} \end{pmatrix}$$

wherein:

$N_{RT,i}(n)$ is a number of active real-time users in femtocell i in period n, $SINR_{RT}$ is a required SINR of real-time users, $N_{NRT,i}(n)$ is a number of active non-real-time users in femtocell i in period n, $SINR_{NRT}$ is a required SINR of non-real-time users, NF is a noise floor at each mobile device, the noise floor including thermal noise and noise figure, $PL_{j,i}$ is a path loss from mobile device j to the base station for femtocell i, $P_{max}$ is a maximum transmit power of the base station for one of said at least one femtocell, $P_{i,allowed}$ is a transmit power allowed by those the base station for femtocells that have a higher power assignment priority higher than the base station for femtocell i, and I is a received interference at the mobile devices associated with the base station for femtocell i from other neighboring femtocells.

15. The system of claim 14, wherein $P_{i,allowed}$ is calculated as $$P_{i,allowed} = \min_{\forall j \text{ where } R_j(n) > R_i(n)} (I_{available,j} \times PL_{BS\_i,UE\_j}), \text{ wherein}$$

$$I_{available,j} = I - \sum_{\forall k \text{ where } R_k(n) > R_j(n)} P_k(n) \times PL_{BS\_k,UE\_j}, \text{ and}$$

$PL_{BS\_i,UE\_j}$ is an average path loss between the base station for femtocell i and mobile device j.

16. The method of claim 1, wherein calculating a power assignment priority for each femtocell comprises calculating a power assignment priority corresponding to each femtocell based on real-time and non-real time traffic of the corresponding femto-cell.

* * * * *